S. W. BROOKE.
Meal-Chest.
No. 222,656.    Patented Dec. 16, 1879.
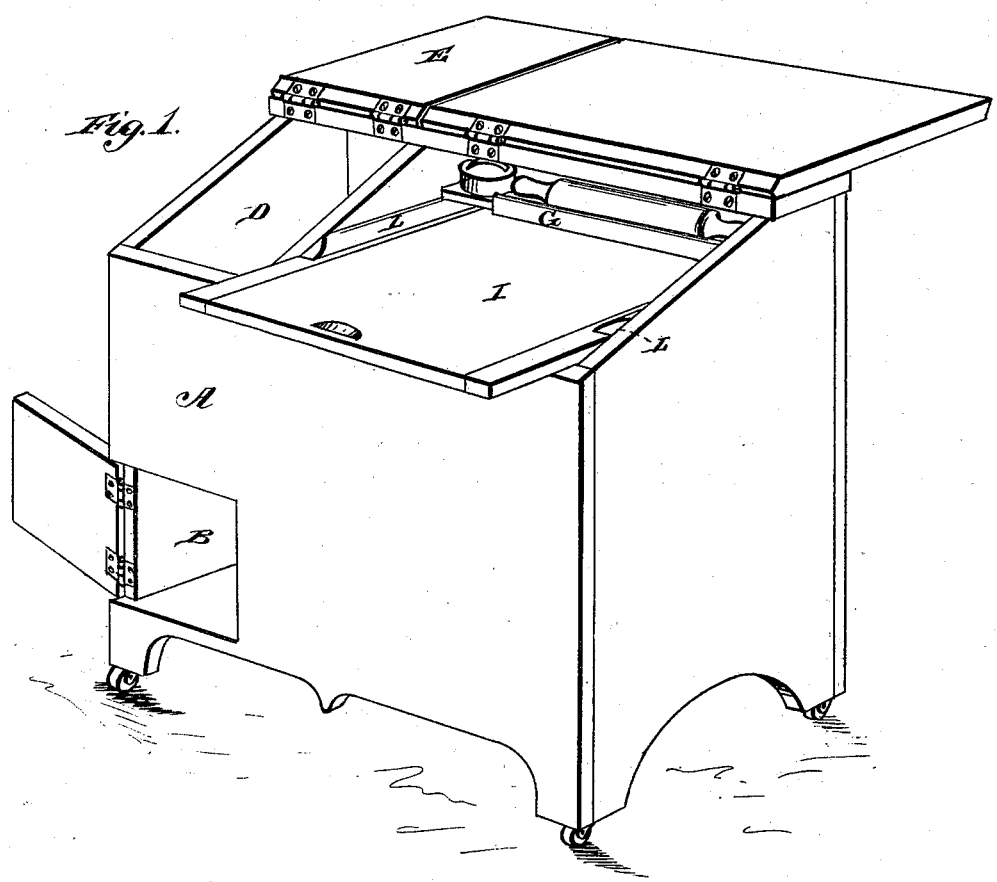
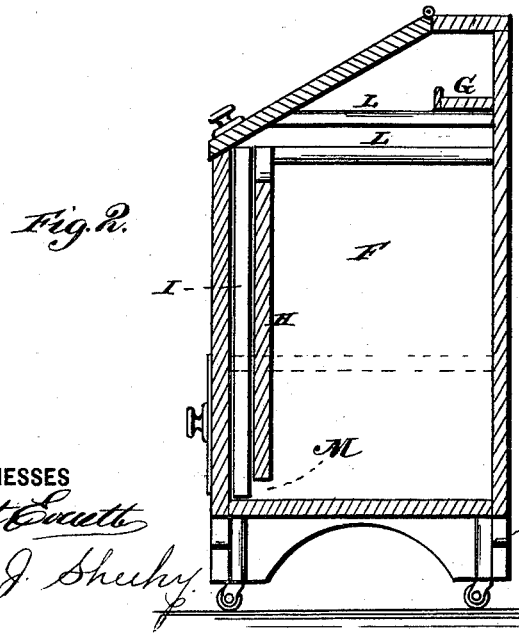

UNITED STATES PATENT OFFICE.

SAMUEL W. BROOKE, OF NEWARK, OHIO.

IMPROVEMENT IN MEAL-CHESTS.

Specification forming part of Letters Patent No. 222,656, dated December 16, 1879; application filed September 20, 1879.

*To all whom it may concern:*

Be it known that I, SAMUEL W. BROOKE, of Newark, in the county of Licking and State of Ohio, have invented certain new and useful Improvements in Meal-Chests; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my meal-chest, showing the covers opened; and Fig. 2 is a vertical central sectional view of the same.

My invention relates to meal-chests; and it consists in a meal-chest having at its front side a receptacle for the kneading-board formed by the partition, which extends nearly to the bottom of the chest, and leaves an open space to admit of flour dropping from the board to the main part of the chest, as hereinafter fully described, and particularly pointed out in the claim.

In the drawings, A refers to the four walls of the chest. The chest is, in practice, to be mounted upon caster-wheels, so that it can be moved around the room in which it may be located.

B is a compartment arranged to contain the pans which are ordinarily used for baking purposes.

D is a compartment, which constitutes a chest or bin for meal, and which is covered by a lid, E.

F is a compartment, which is considerably larger than the compartment D. Within this compartment is a shelf, G, which forms a receptacle for the rolling-pin, cake-cutter, and other articles.

H designates a partition in compartment F, and this partition is arranged so that a space shall be left between it and the front wall of the chest. Within such space I slide the kneading-board I. When this kneading-board is to be used it is raised out and placed between the guides L L and extended out as far as desirable, so that it will serve the purpose of a kneading-table.

When the kneading-board is drawn out and placed in the guides it is evident that no flour will be wasted, since all will fall directly into the main compartment. After using the kneading-board it may be drawn out until its rear edge reaches the front terminus of the guides, after which it may be dropped down into the space provided for it, as aforesaid, in which case all flour will fall directly into the compartment or bin; but in case of any flour being left upon the board it will be scraped off and pass into the bin through an opening, M, between the space into which the board fits.

What I claim is—

The meal-chest having at its front side a receptacle for the kneading-board formed by the partition H, which extends nearly to the bottom of the chest, and leaves an open space, M, to admit flour dropping from the board to the main part of the chest.

In testimony that I claim the above I have hereunto subscribed my name in the presence of two witnesses.

SAMUEL W. BROOKE.

Witnesses:
CHAS. FOLLETT,
CHAS. H. FOLLETT.